United States Patent [19]
Marcellin-Dibon

[11] Patent Number: 5,796,446
[45] Date of Patent: Aug. 18, 1998

[54] TELEVISION RECEIVER OR VIDEO MONITOR OF THE BACK-PROJECTION TYPE

[75] Inventor: Eric Marcellin-Dibon, Strasboung, France

[73] Assignee: Thomson multimedia S.A., Courbevoie, France

[21] Appl. No.: 624,696

[22] Filed: Mar. 27, 1996

[30] Foreign Application Priority Data

Apr. 13, 1995 [FR] France ................... 95 04479

[51] Int. Cl.$^6$ .................................................. H04N 5/74
[52] U.S. Cl. ........................... 348/744; 348/786; 353/74; 353/78
[58] Field of Search .................... 348/744, 786, 348/739; 353/74, 78, 99; 359/456; H04N 5/74

[56] References Cited

U.S. PATENT DOCUMENTS

| | | | |
|---|---|---|---|
| 5,142,373 | 8/1992 | Akiyama et al. | 358/231 |
| 5,223,869 | 6/1993 | Yhanagi | 353/78 |
| 5,613,748 | 3/1997 | Yoshida et al. | 353/74 |

FOREIGN PATENT DOCUMENTS

| | | | |
|---|---|---|---|
| 165093 | 6/1994 | Japan | H04N 5/74 |
| 94/18791 | 8/1991 | WIPO | H04N 5/74 |

OTHER PUBLICATIONS

Patent Abstracts of Japan vol. 17 No. 153, 25 Mar. 1993 & JP-A-04 320229 (Dainippon Printing Co. Ltd.) 11 Nov. 1992.

Patent Abstracts of Japan vol. 14 No. 8 (-987), 10 Jan. 1990 & JP-A-001 257834 (Asahi Optical Co. Ltd.) 13 Oct. 1989.

Patent Abstracts of Japan, vol. 11 No. 209 (E-521) 7 Jul. 1987 & JP-A-62 030483 (Matsushita) 9 Feb. 1987.

Patent Abstracts of Japan, vol. 8 No. 105 (P-274), 17 May 1984 & JP-A-59 015925 (Mitsubishi) 27 Jan. 1984.

*Primary Examiner*—Glenton B. Burgess
*Attorney, Agent, or Firm*—Joseph S. Tripoli; Frederick A. Wein

[57] ABSTRACT

A television receiver or video monitor of the back-projection type, in which a projector forms an image which can be observed on a visual display screen by rear illumination after reflection on a deflecting mirror. The projector includes in immediate proximity to the visual display screen and parallel to the latter, a reflection-transmission screen comprising a Fresnel surface, the projector, reflection-transmission screen and deflecting mirror being configured together to form an optical system such that the reflection-transmission screen reflects the rays directly emanating from the projector in the direction of the deflecting mirror and transmits these rays after their reflection on this deflecting mirror. The Fresnel surface includes striations of triangular cross-section, these striations locally forming prisms and capable of reflecting the rays which strike them when the angle of incidence of the rays are greater than a predetermined value and of transmitting the rays in an opposite case.

6 Claims, 3 Drawing Sheets

TELEVISION RECEIVER OR VIDEO MONITOR OF THE BACK-PROJECTION TYPE

BACKGROUND OF THE INVENTION

The invention relates to a television receiver or video monitor of the back-projection type.

DESCRIPTION OF THE PRIOR ART

Large-size video screens, typically having a diagonal exceeding one metre (40 inches), make use, in a known manner, of back-projection optical systems such as that illustrated in FIG. 1, in which a video projector, generally a projector 10 comprising a liquid-crystal display illuminated in transmitted light by a light source, projects its beam onto an inclined mirror 12, which deflects said beam towards a translucent screen 14 on which the image to be visually displayed is formed. This configuration making use of a deflecting mirror is necessary in order to avoid a prohibitive bulkiness of the equipment; the projector 10 may, in fact, be accommodated in a base supporting the screen 14 and also enclosing the various electronic circuits and the loudspeakers of the television receiver.

It is nonetheless true that the depth $L_1$ of such a system does however continue to be relatively large, of the order of 45 cm for a 16/9 screen having a diagonal of 106 cm (42 inches). The depth $L_1$ is, in fact, determined by the angle of inclination of the mirror 12 in relation to the vertical, of the order of 40°.

In any event, in spite of the relative compactness as compared with cathode-ray tubes, these known systems do however continue to be very bulky, and cannot be compared with the extremely small thicknesses of the visual display systems of the "flat screen" type.

SUMMARY OF THE INVENTION

One of the objects of the present invention is to propose a television receiver or video monitor of the back-projection type, the optical system of which has a depth which is very much less than that of the known systems.

It will be seen by way of example that, by virtue of the configuration of the invention, the depth of an optical system for a 16/9 screen having a diagonal of 106 cm (42 inches) may be reduced to 25 cm, thus permitting the integration thereof in a cabinet which can far more readily be accommodated, and which can even be fixed on a wall; clearly, this is not permitted by the known systems, in view of their excessive depth.

To this end, the invention proposes a television receiver or video monitor of the aforementioned back-projection type, that is to say in which a projector forms an image which can be observed on a visual display screen by rear illumination after reflection on a deflecting mirror, including, in immediate proximity to the visual display screen and parallel to the latter, a reflection-transmission screen comprising a Fresnel surface, the projector, the reflection-transmission screen and the deflecting mirror being configured together in an optical system such that the reflection-transmission screen reflects the rays directly emanating from the projector in the direction of the deflecting mirror and transmits these rays after their reflection on this deflecting mirror, characterized in that the Fresnel surface includes striations of triangular cross-section, these striations locally forming prisms and being capable of reflecting the rays which strike them when the angle of incidence of the rays is greater than a predetermined value and of transmitting the rays in the opposite case.

According to a certain number of advantageous features:

- the semi-angle at the vertex of each prism at the location of the entrance face of the light beam is substantially equal to the angle of incidence of the beam emanating from the projector at the location where said beam strikes this entrance face;
- the semi-angle at the vertex of each prism at the location of the exit face of the light beam is substantially equal to the angle of incidence of the beam emanating from the projector either at the location where said beam strikes the entrance face of this prism or at the location where said beam strikes the entrance face of a prism which is adjacent or offset by an integral number of prisms, the thickness of the reflection-transmission screen being chosen in such a manner that the rays penetrating through said entrance face essentially all emerge through said exit face;
- there is further provided a diffusing screen placed in immediate proximity to the reflection-transmission screen and capable of directing substantially in one and the same direction of vision the rays emanating from the reflection-transmission screen after passing through the latter;
- the striations of the Fresnel surface are curvilinear striations in the form of arcs of concentric circles centred at the location of the virtual image of the projection focus after reflection on the reflection-transmission screen.

BRIEF DESCRIPTION OF THE DRAWINGS

Further features and advantages of the invention will become apparent on reading the description given below, which is made with reference to the accompanying drawings.

DESCRIPTION OF THE PREFERRED EMBODIMENT

Figure 2:
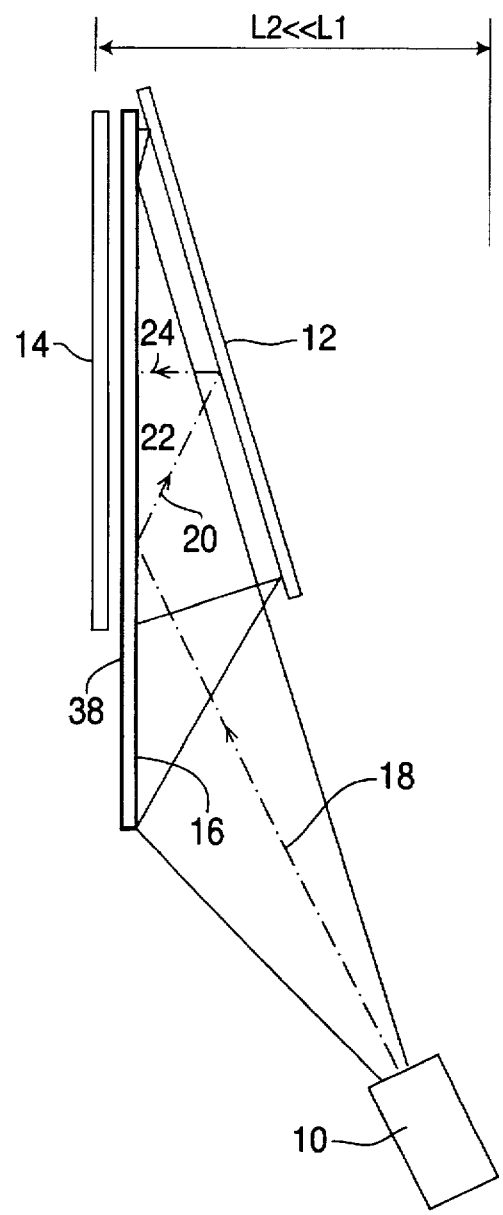
FIG. 2 is similar to FIG. 1, for the optical system according to the invention.

In FIG. 2, the configuration of the back-projection optical system according to the invention has been diagrammatically represented.

Figure 1:
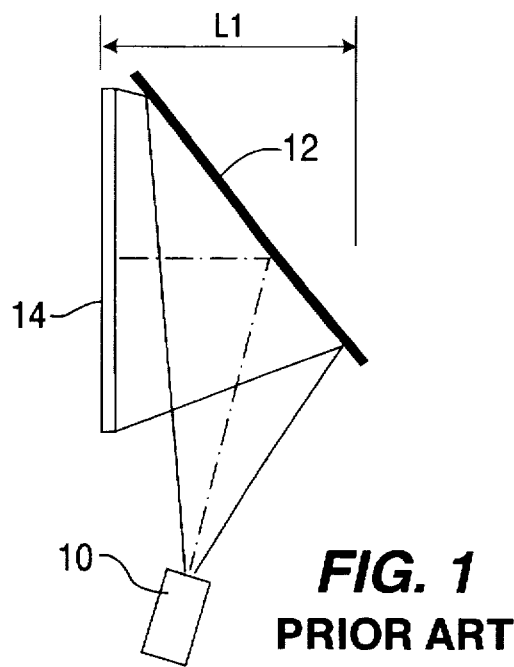
FIG. 1, aforementioned, illustrates the structure of a back-projection optical system of the prior art.

The projector 10, which is generally a projector including a liquid-crystal display illuminated in transmitted light, is oriented in such a manner as to direct its beam not towards the mirror 12 (as in the configuration of the prior art as illustrated in FIG. 1) but towards a specific screen 16, which will be referred to hereinbelow as "reflection-transmission screen" or "Fresnel surface screen" situated in immediate proximity to the visual display screen 14 and parallel to the latter. Thus, the projector 10 is turned upwards and forwards, and not, as in the prior art, towards the rear (save for providing a supplementary deflecting mirror between the projector and the reflection-transmission screen).

The reflection-transmission screen 16 is a surface bearing curvilinear striations of triangular cross-section, forming a Fresnel surface turned in the direction of the incident rays (that is to say on the face opposite to that turned towards the visual display screen 14). As will be explained in greater detail below, this surface has the property of being, depending upon the angle of incidence of the light rays, either reflecting (for a large angle of incidence) or transmitting (for a small angle of incidence).

Furthermore, the choice of a Fresnel surface as reflection-transmission screen has the advantage of a quasi-insensitivity of the optical properties to the wavelength, to the polarization and to the angle of incidence, and thus optical properties such that the image will virtually not be affected in visible fashion by reflection or by passing through the Fresnel surface.

A light ray 18 emitted by the projector 10 will first of all strike the Fresnel surface with a large angle of incidence, and it is thus reflected by the latter, as illustrated at 20, in the direction of the deflecting mirror 12 which it comes to strike at 22, to be deflected at 24 towards the Fresnel surface with a very small angle of incidence. The ray 24 will thus pass through the reflection-transmission screen 16 in the direction of the visual display screen 14.

In this configuration, the angle of inclination of the mirror 12 in relation to the vertical, which is equal to the complement of the maximum angle of incidence of the light rays emitted by the projector in the direction of the reflection-transmission screen 16, is significantly less than what it was in the configuration of the prior art incorporating single reflection (compare with FIG. 1).

In practice, the projector 10 is positioned in elation to the reflection-transmission screen 16 in such a manner that the angle of incidence of the lower rays is slightly greater than the critical angle of the material used for the reflection-transmission screen 16, typically an angle of incidence of 45° for a critical angle of 42° of a screen constructed of acrylic resin. With a beam divergence of ±17.5° in the vertical plane, the angle of incidence thus reaches approximately 80° at the vertex of the screen 16.

The reflection-transmission screen 16 is a Fresnel surface including a multiplicity of striations which have triangular cross-section and which are curvilinear (it will be seen, in describing FIGS. 8 and 9, how the curvature of these curvilinear striations is defined in the plane in which they extend), each striation acting in the manner of a prism with regard to the rays which strike it.

In view of the variation of the angle of incidence of the beam between the lower part and the upper part of the reflection-transmission screen 16, it is necessary to cause variation of the angle of each prism in progressive fashion from one striation to the next (for the sake of simplicity, the expression "angle of the prism" will be used to designate the value of the semi-angle at the vertex formed by the facet of the striation situated on the same side as the incident rays, with respect to the normal to the surface of the screen).

Figure 3:
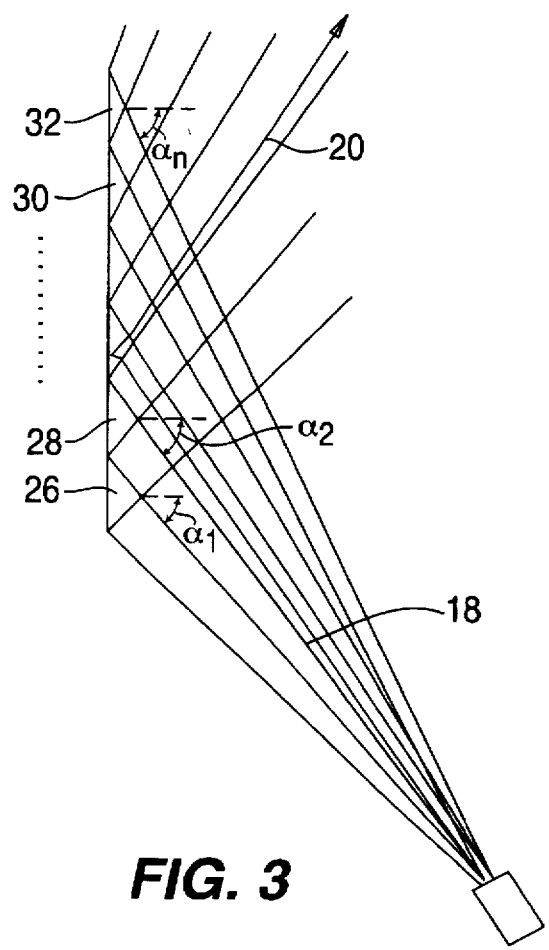
FIG. 3 illustrates the variation of the angles of inclination of the Fresnel striations as a function of the angle of incidence of the beam on the screen.

This variation of the angle of the prisms is illustrated in FIG. 3, on a very greatly enlarged scale (in practice, the pitch of the striations is very small, of the order of 0.2 mm, in order not to cause any visible effects on the image). From the bottom to the top, the successive striations 26, 28 . . . 30, 32 have prism angles $\alpha_1, \alpha_2, \ldots \alpha_n$ which are increasing and equal to the angle of incidence of the light ray striking the striation. On account of this, the light losses are minimized by preventing zones of the screen from intercepting the beam, preventing their reflection, as will be seen in greater detail in FIG. 6, which is explained hereinbelow.

The various striations each have, in cross-section, the shape of an isosceles (FIG. 6) or substantially isosceles (FIG. 7, see lower part) triangle, that is to say that the angle of the entrance face of the prism is equal or substantially equal to the angle of the exit face of the same prism. Thus, the Fresnel surface may deflect the incident rays with a large angle of incidence in the same way as would be done by a plane mirror; the incident ray 18 emitted by the projector is thus deflected to 20 after having struck the Fresnel surface 16.

After a second reflection on the deflecting mirror 12, the rays 24 once again strike the Fresnel surface of the reflection-transmission screen 16, but with a far smaller angle of incidence, and therefore pass through this screen 16. As the reflection-transmission screen 16 is placed in the focal plane, the passage of the beam through the prisms does not affect the quality of the image.

Figure 4:
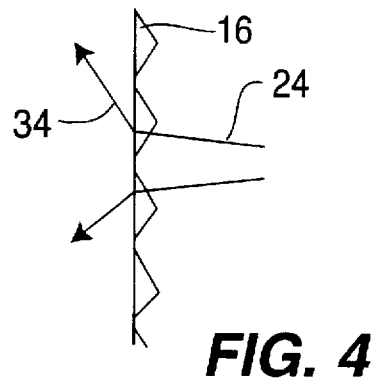
FIGS. 4 and 5 illustrate the manner in which the placing of a diffusing screen permits the forward directing of the light rays emitted by the Fresnel surface of the system of the invention.
Figure 5:
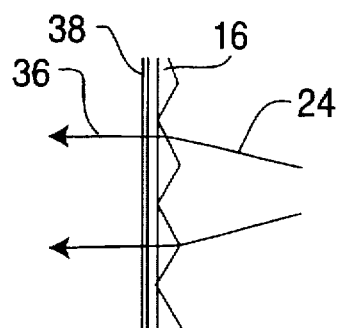

Nevertheless, in view of the presence of the prisms, these rays will be deflected upwards or downwards (depending upon the point of incidence) as they pass through, as illustrated at 34 in FIG. 4.

In order to direct these rays 34 towards the observer in the direction 36, there is placed against the reflection-transmission screen 16, on the same side as the exit face, a diffusing screen 38 such as those conventionally employed for transmitted-light image projections. By way of a variant, it is likewise possible to provide a complementary Fresnel surface, that is to say a surface similar to that of the reflection-transmission screen 16 but placed back to back with said surface, providing, of course, an intermediate air gap.

Figure 6:
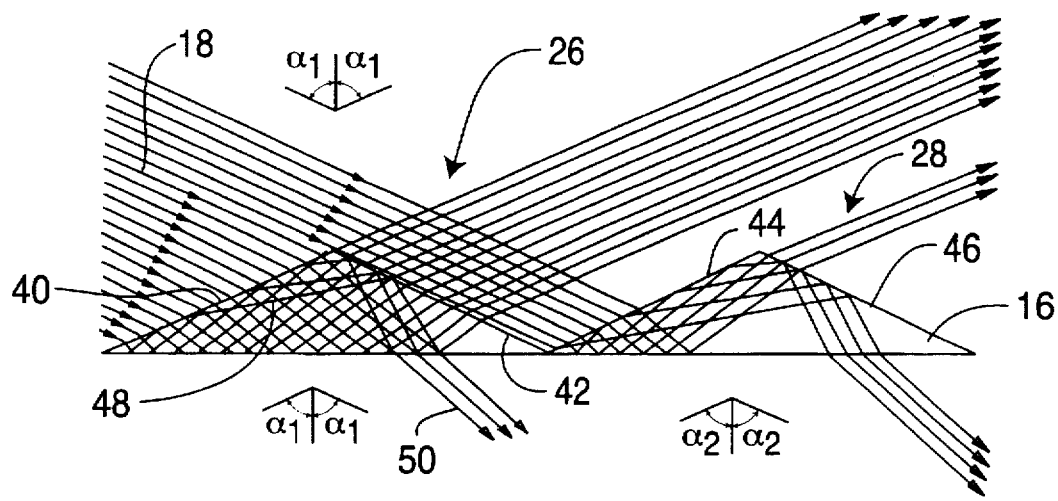
FIG. 6 is an enlarged view of the Fresnel surface showing the manner in which the incident rays are reflected.

FIG. 6 shows an enlarged detail of the Fresnel surface, showing two consecutive striations 26, 28 and the manner in which the incident rays are reflected by these.

In the assumed case of FIG. 6, the thickness of the reflection-transmission screen 16, excluding prisms, is very small and virtually negligible. The striation 26 has an angle $\alpha_1$ equal to the angle of incidence of the rays 18 of the beam which strikes it at 40, these rays leaving the opposite face of the prism at 42 with an angle of reflection likewise having the value $\alpha_1$. The adjacent striation 28, of angle $\alpha_2$ slightly greater than $\alpha_1$ (to correspond to the angle of incidence of the rays on the entrance face 44), receives the rays which have not struck the entrance face 40 of the striation 26 and deflects these towards the exit face 46. As the exit face 42 has the same angle as the entrance face 40, the rays which do not strike the face 40 are not blocked off and accordingly all strike the entrance face 44 of the adjacent striation 28, to be deflected by the latter towards the exit face 46 of the latter.

In the course of passing through the entrance face, for example the entrance face 40 of the striation 26, the secondary refraction deflects certain rays at 48 towards the exit face 42 but, as these rays have a large angle of incidence in relation to this surface, they do not pass through the latter and are reflected towards the rear to 50. In view of the nature of the material, this secondary reflection is however very greatly reduced and does not have the effect of disturbing the image passed to the observer.

Figure 7:
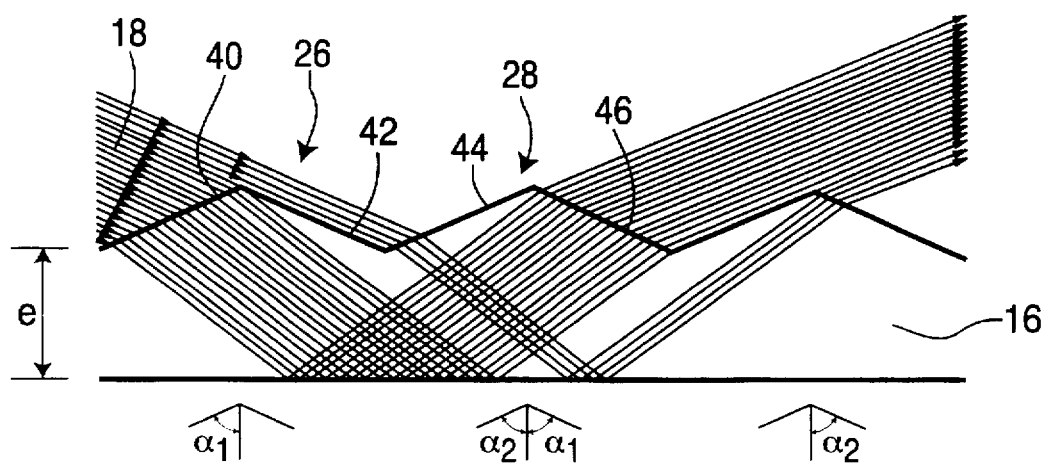
FIG. 7 is similar to FIG. 6, for a Fresnel surface having a larger thickness.

FIG. 7 illustrates the case where the reflection-transmission screen 16 has a thickness e which is not negligible in relation to the height of the striations. In this case, this thickness e is chosen in such a way that a ray striking, for example, the entrance face 40 of a striation 26 is reflected, not by the exit face 42 of this same striation, but by the exit face 46 of the adjacent striation 28, which will then have the same angle $\alpha_1$ as the entrance face 40 of the striation 26. For an even greater thickness, the precise value of the thickness will be chosen in order that the rays striking the entrance face of a striation should be reflected by the exit face situated two striations further on, or three striations further on, etc.

Figure 8:
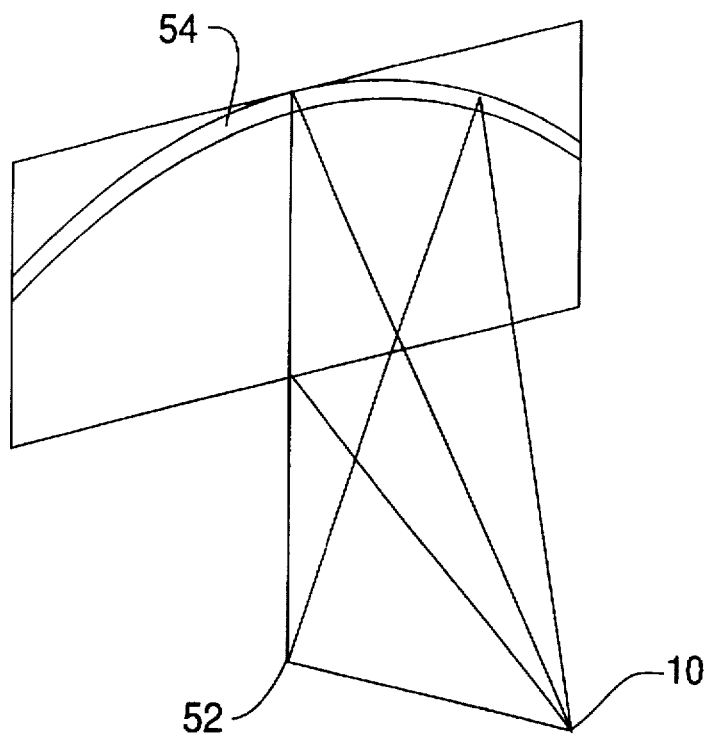
FIG. 8 is a perspective view showing the manner in which the curvilinear striations of the Fresnel surface are defined.

FIG. 8 shows, in perspective, the appearance of an isolated striation, referenced 54, of the reflection-transmission screen 16. The point 52 is the virtual image of the projection focus of the projector 10 after reflection on the screen 16, and each striation is a curvilinear striation in the form of an arc of a circle centred on this point 52.

Figure 9:
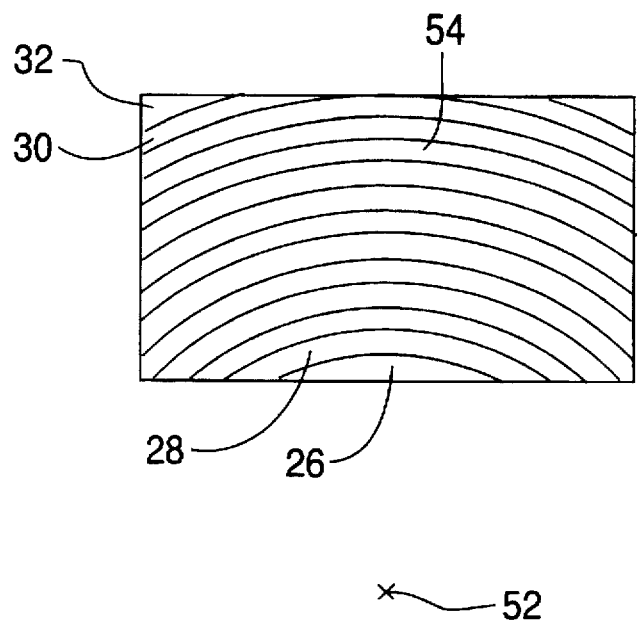
FIG. 9 is a front view of this same surface.

FIG. 9 shows, in front view, the appearance of the successive striations, which are all concentric.

It is possible for example to construct, in accordance with the teachings of the invention, a back-projection television receiver or video monitor having a 16/9 screen having a diagonal of 106 cm (42 inches) exhibiting the following optical and dimensional characteristics:

depth $L_2$=25 cm (in place of $L_1$=45 cm with a conventional system for a screen of the same dimensions);

distance from the lens of the projector 10 to the screen: 800 mm;

dimension of the pupil of the projection lens: 15 mm;

reflection-transmission screen constructed of acrylic material of refractive index 1.49;

dimensions of the reflection-transmission screen 16: height 710 mm, width 930 mm;

centre of curvature of the striations (point 52 of FIG. 8) situated 240 mm below the lower edge of the reflection-transmission screen 16;

pitch of the striations: 0.2 mm.

What is claimed is:

1. A television receiver or video monitor of the back-projection type, in which a projector forms an image which can be observed on a visual display screen by rear illumination after reflection on a deflecting mirror, including, in immediate proximity to the visual display screen and parallel to the screen, a reflection-transmission screen comprising a Fresnel surface, the projector, the reflection-transmission screen and the deflecting mirror being configured together in such a manner as to form an optical system such that the reflection-transmission screen reflects the rays directly emanating from the projector in the direction of the deflecting mirror and transmits these rays after their reflection on this deflecting mirror, characterized in that the Fresnel surface includes striations of triangular cross-section, these striations locally forming prisms and being capable of reflecting the rays which strike them when the angle of incidence of the rays is greater than a predetermined value and of transmitting the rays in an opposite case.

2. The television receiver or video monitor of claim 1, wherein the semi-angle at the vertex of each prism at the location of the entrance face of the light beam is substantially equal to the angle of incidence of the beam emanating from the projector at the location where said beam strikes this entrance face.

3. The television receiver or video monitor of claim 2, wherein the semi-angle at the vertex of each prism at the location of the exit face of the light beam is substantially equal to the angle of incidence of the beam emanating from the projector at the location where said beam strikes the entrance face of this prism.

4. The television receiver or video monitor of claim 2, wherein the semi-angle at the vertex of each prism at the location of the exit face of the light beam is substantially equal to the angle of incidence of the beam emanating from the projector at the location where said beam strikes the entrance face of a prism which is adjacent or offset by an integral number of prisms, the thickness of the reflection-transmission screen being chosen in such a manner that the rays penetrating through said entrance face all emerge essentially through said exit face.

5. The television receiver or video monitor of claim 1, further comprising a diffusing screen placed in immediate proximity to the reflection-transmission screen and capable of directing substantially in one and the same direction of vision the rays emanating from the reflection-transmission screen after passing through the latter.

6. The television receiver or video monitor of claim 1, wherein the striations of the Fresnel surface are curvilinear striations In the form of arcs of concentric circles centred at the location of the virtual image of the projection focus after reflection on the reflection-transmission screen.

* * * * *